(12) United States Patent
Kung et al.

(10) Patent No.: US 7,605,999 B1
(45) Date of Patent: Oct. 20, 2009

(54) DISK DRIVE COVER HAVING A SEE-THROUGH INSERT INCLUDING AN ELECTRICALLY CONDUCTIVE MATERIAL

(75) Inventors: May C. Kung, San Jose, CA (US); Sudha Narayan, San Jose, CA (US); Chunjer Chuck Cheng, Saratoga, CA (US); Mahdad Manavi, San Clemente, CA (US); John R. Gustafson, Los Gatos, CA (US)

(73) Assignee: Western Digital Technolgies, Inc., Lake Forest, CA (US)

( * ) Notice: Subject to any disclaimer, the term of this patent is extended or adjusted under 35 U.S.C. 154(b) by 687 days.

(21) Appl. No.: 11/442,781

(22) Filed: May 30, 2006

(51) Int. Cl.
*G11B 33/14* (2006.01)
*G11B 5/012* (2006.01)
(52) U.S. Cl. .................................. 360/97.01; 360/97.02
(58) Field of Classification Search .... 360/97.01–97.04
See application file for complete search history.

(56) References Cited

U.S. PATENT DOCUMENTS

| | | | | |
|---|---|---|---|---|
| 6,052,255 | A | * | 4/2000 | Kawabe et al. ........... 360/97.02 |
| 7,019,962 | B2 | * | 3/2006 | Bandic et al. .......... 361/679.33 |
| 2005/0063090 | A1 | | 3/2005 | Bandic et al. |
| 2005/0063146 | A1 | | 3/2005 | Bandic et al. |
| 2005/0076493 | A1 | | 4/2005 | Bandic et al. |

* cited by examiner

*Primary Examiner*—A. J. Heinz
(74) *Attorney, Agent, or Firm*—Barcelo & Harrison, LLP

(57) ABSTRACT

A disk drive includes an opaque cover secured to a base, where the opaque cover has an opening. A see-through insert, which includes an electrically conductive material, is affixed to the opaque cover over the opening. The electrically conductive material may be a coating applied to the see-through insert which, in one embodiment is a polymer coating having a certain surface resistivity. Alternatively, the coating's ESD-dissipative properties may be due to the presence of sputtered gold, sputtered indium tin oxide or a metal film. The electrically conductive material may alternatively be embedded in the see-through insert.

19 Claims, 6 Drawing Sheets

DISK DRIVE COVER HAVING A SEE-THROUGH INSERT INCLUDING AN ELECTRICALLY CONDUCTIVE MATERIAL

FIELD OF THE INVENTION

The invention relates in general to data storage systems such as disk drives, and in particular to incorporating a see-through insert into the disk drive housing.

BACKGROUND OF THE INVENTION

Disk drives typically store data on a magnetic medium and/or an optical storage media. Magnetic hard disk drives are widely are manufactured in different standard sizes and/or formats, such as desktop drives, mobile (1.8 and 2.5 inch) drives and so-called microdrives.

Disk drives typically utilize an actuator assembly that positions one or more read/write heads. The actuator assembly typically includes a powerful voice coil motor which swiftly moves the read/write head(s) across the surface of the rotating disk(s). Information may be written to and read from specific locations on the storage surface of the disk. Disk drives are increasingly being used in consumer electronic devices other than personal computers. For example, disk drives have recently found their way into personal digital assistants, mobile phones, MP3 players, digital cameras and the like. However, the disk drives are typically buried within the devices and hidden from the consumer's eye. As a result, consumers have been unable to view and experience the visual effect produced by the rapid rotation of the disks coupled with the quick movements of the read/write head. Previous efforts to provide a view of these internal movements have resulted in compromising electrostatic discharge dissipation and/or the structural integrity of the drives. As such, there is a need for a disk drive which allows users to view at least some of the internal movements which are typically hidden from the consumer, without incurring the aforementioned drawbacks.

SUMMARY OF THE INVENTION

A disk drive having a see-through insert is disclosed and claimed. The disk drive includes a base, a spindle motor attached to the base, and at least one disk mounted to the spindle motor. The disk drive also includes a pivoting actuator attached to the base that is used to position a head attached thereto for reading data from the disk. In one embodiment, an opaque cover is secured to the base, where the opaque cover includes an opening. A see-through insert, which includes an electrically conductive material, may be affixed to the opaque cover over the opening.

Other aspects, features, and techniques of the invention will be apparent to one skilled in the relevant art in view of the following detailed description of the exemplary embodiments.

DETAILED DESCRIPTION OF THE EXEMPLARY EMBODIMENTS

Figure 1:
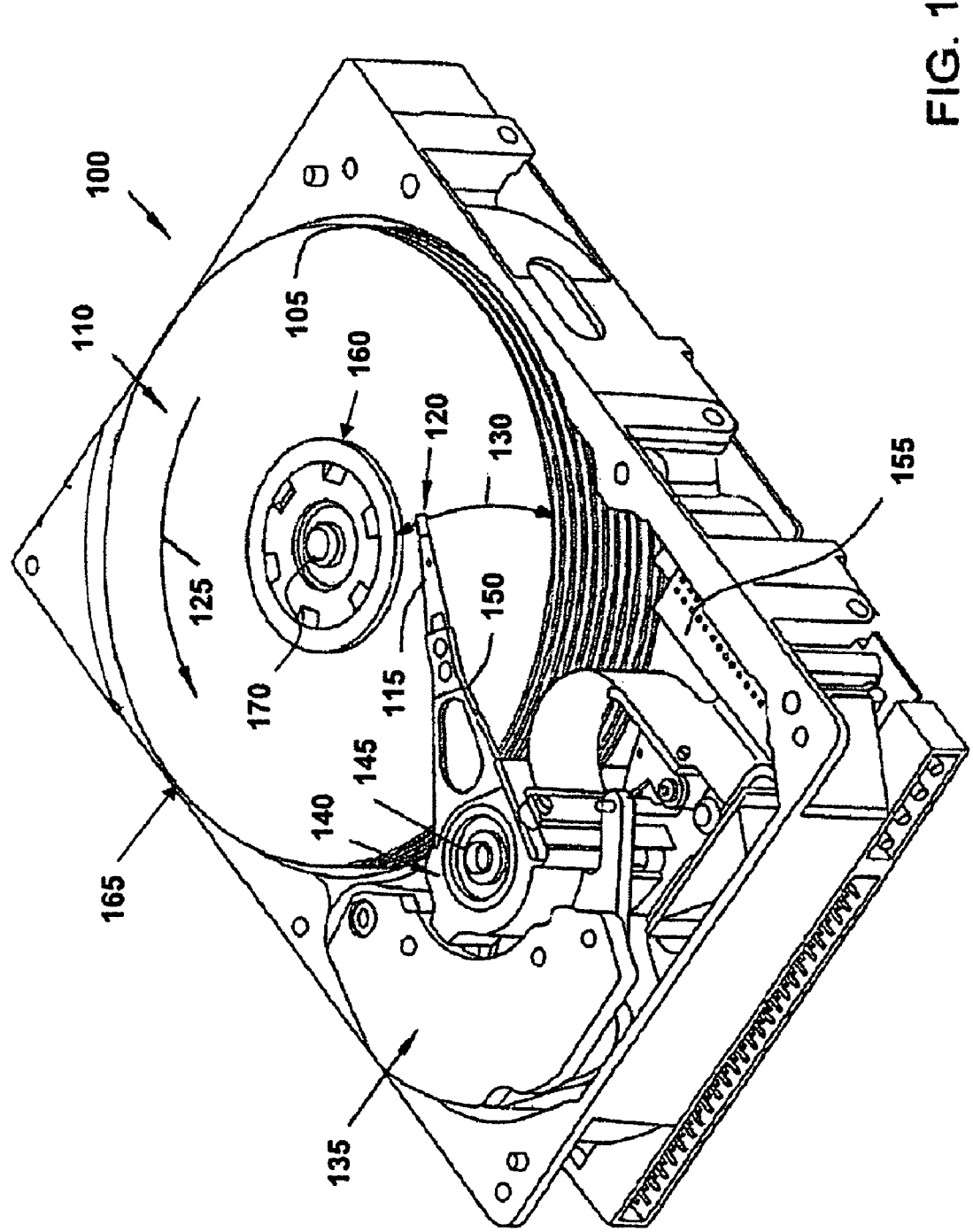
FIG. 1 is a perspective view of a disk drive consistent with one embodiment of the invention.

A disk drive is configured with an opaque cover secured to a base, where the opaque cover includes an opening into which a see-through insert may be introduced. The see-through insert may be manufactured from various see-through materials, for example a polycarbonate, glass, acrylic, ceramic or quartz and be affixed to the opaque cover over the opening. The see-through insert also includes an electrically conductive material.

As will be described in more detail below, the electrically conductive material may be a coating applied to the surface of the see-through insert. In certain other embodiments, the electrically conductive material may be embedded in the see-through insert. For example, carbon nanotubes or any metallic material may be embedded into the see-through insert during the manufacturing process.

In certain embodiments, the opaque cover may have a thermal expansion coefficient that is substantially different than the thermal expansion coefficient of the see-through insert. In such embodiments, and as described in detail below, the see-through insert is preferably affixed to the opaque cover using a compliant adhesive, which may also be conductive. Alternatively in such embodiments, a foam gasket may be used between the see-through insert and the opaque cover so as to provide a shear compliance to the seal between the see-through insert and the cover and thereby accommodate differential thermal expansion.

In certain other embodiments, the opaque cover may have a thermal expansion coefficient that is substantially the same as the thermal expansion coefficient of the see-through insert. In such embodiments, the see-through insert may be optionally rigidly affixed to the opaque cover over the opening using a conductive adhesive.

Regardless of whether the thermal expansion coefficient is substantially the same as the thermal expansion coefficient of the see-through insert or not, a conductive label may be affixed to one side of the aforementioned see-through insert using a conductive adhesive. The label may be of sufficient size so as to also contact the cover and provide an electrostatic discharge path there between.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the figures, FIG. 1 illustrates a disk drive storage device 100 capable of implementing one or more embodiments of the invention. Disk drive 100 includes a disk pack 105 having one or more disks, each of which have storage surfaces 110 comprised of a magnetic material or optically-readable material. Each disk in the disc pack 105 is accessible by a head stack assembly 115 that includes a read/write head 120. The read/write head 120 includes a small transducer and a slider that mechanically supports the transducer. The slider is further configured to create an air bearing which maintains a constant distance between storage surfaces 110 and the read/write head.

A spindle motor 170 drives rotation of the disks in the disk pack 105 in the direction shown by arrow 125. As the disks are rotated, the head stack assembly (HSA) 140 accesses different locations on the storage surfaces 110 of the disks. The HSA 140 is actuated for radial movement relative to the storage surfaces 110, such as in a direction indicated by arrow 130, in order to access the different tracks (or radial positions) on the storage surfaces 110. Such actuation of the HSA 140 is provided by a servo system that typically includes a voice coil motor (VCM) 135, which pivots the HSA 140 about an axis 145. The storage surfaces 110 extend from a central hub 160 and are encased, along with the other components, within a base 165. The central hub 160 and attached disk pack 105 are rotated by the spindle motor 170, which is itself secured to the base 165. HSA 140 also includes at least one arm 150 that supports the head gimbal assembly (HGA) 115. The HGA 115 includes head 120. Disk drive 100 further includes circuitry 155 for helping to control operation of disk drive 100 and/or for helping to transfer data to and from the disk drive 100.

The spindle motor 170, HSA 140, VCM 135 and disk pack 105 may then be enclosed with a cover (not shown) that is sealed to the base 165, thus preventing the entry of contaminants that might adversely affect the reliability of the disk drive operation. The disk drive housing, comprised of both the cover and base, not only seals and protects the aforementioned disk drive components from possible contaminates, but also mitigates the effects of electrostatic discharge (ESD) by providing a continuous grounding path.

Figure 2:
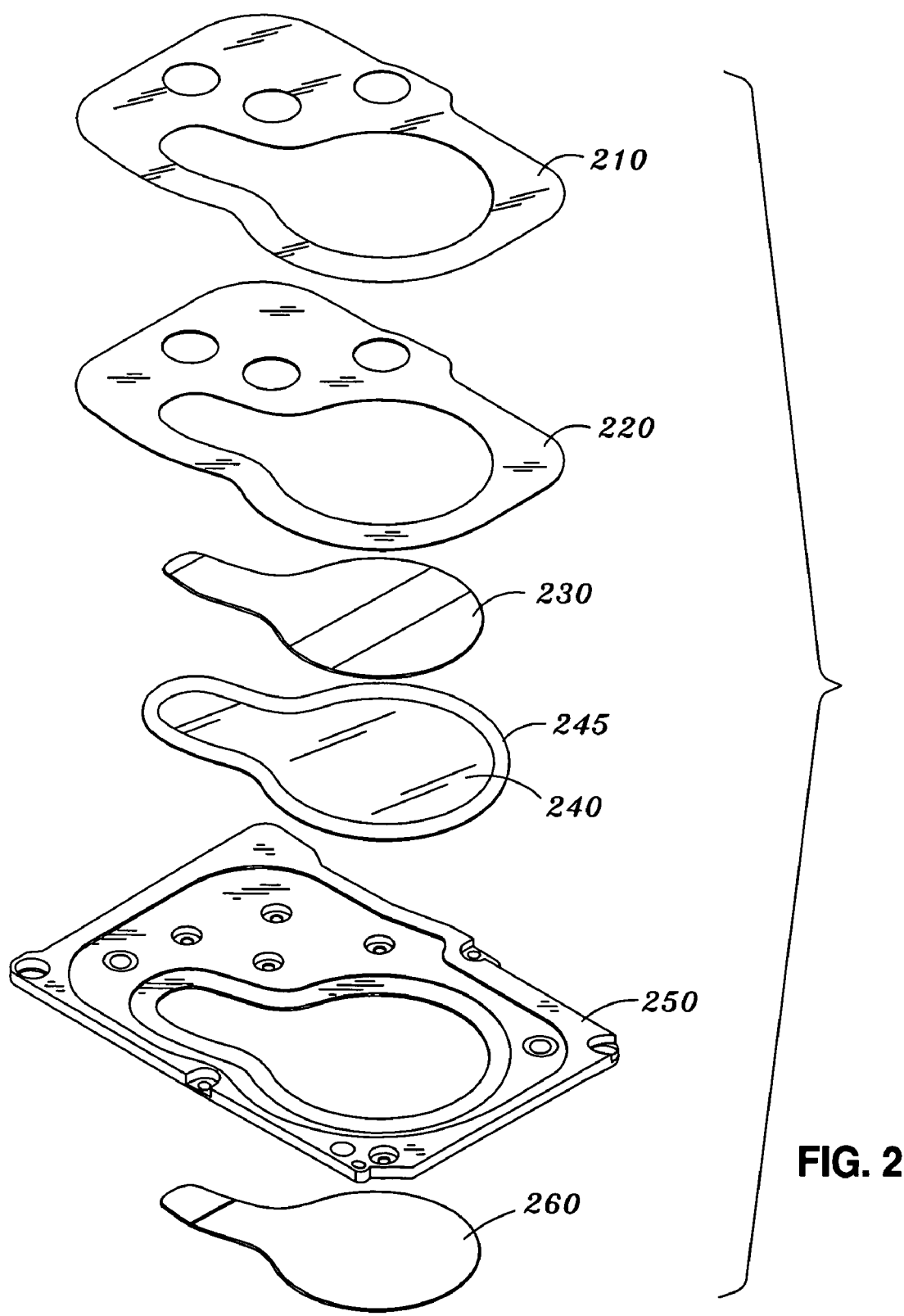
FIG. 2 is a perspective view of the orientation of a see-through insert in accordance with one embodiment of the invention.

FIG. 2 depicts one embodiment of how a see-through insert may be affixed to a disk drive cover using a conductive label. In this embodiment, a see-through insert 240 is oriented over an opening of an opaque rigid cover 250, to which a conductive label 220 is then applied, as shown in FIG. 2. Optional anti-scratch films 210, 230 and 260 may also be used to protect the see-through insert 240 and label 220, respectively.

In certain embodiments, the cover 250 is constructed of a metallic material, while the see-through insert may be constructed of polycarbonate, glass, acrylic, ceramic or quartz. The cover 250 may have a coefficient of thermal expansion (CTE) that is substantially the same as the coefficient of thermal expansion for the see-through insert 240, or alternatively substantially different. For example, where the cover 250 is stainless steel and the see-through insert 240 is glass, their CTEs will be substantially the same. An aluminum cover 250 and polycarbonate see-through insert 240 would similarly have substantially the same CTE values.

Alternatively, the stainless steel cover 250 would have a CTE that is substantially different than the CTE for a fused quartz see-through insert 240. Where aluminum is used for the cover 250 and fused quartz for the see-through insert 240, substantially different CTE values would exist.

As previously mentioned, one aspect of the invention is to include an electrically conductive material in or on the see-through insert 240. To that end, one embodiment the electrically conductive material is a polymer coating applied to a surface of the see-through insert 240 where the coating exhibits a surface resistivity of between about 0.1 and 30 Mega-Ohms. For example, the coating may be the conductive coating sold under the trade name ST-Poly by Achilles Corporation of Tokyo, Japan. Additionally, the electrically conductive material may be a coating that includes one or more of sputtered gold, sputtered indium tin oxide and a metal film. Alternatively, the electrically conductive material may be embedded in the see-through insert 240 and may consist of either carbon nanotubes or any metallic material. Regardless of the form, in one embodiment the electrically conductive material functions to dissipate incoming electrical charges or ESD events by providing a grounding path across the see-through insert.

Depending on how different the CTE for the cover 250 is than the CTE for the see-through insert 240, the insert 240 may further have an optional foam gasket 245 around an edge that is in contact with the cover 250. In this fashion, a strain-tolerant seal can be maintained between the cover 250 and the see-through insert 240 even during expected temperature changes, such as the expected temperature increase of approximately 45 degrees Celsius associated with disk drive operation.

FIG. 2 further depicts a conductive label 220 affixed to the see-through insert 240. In certain embodiments, the label 220 is affixed to the see-through insert 240 using a conductive adhesive, such as a pressure-sensitive adhesive. In one embodiment, the conductive adhesive may be the product sold under the name Form-in-Place Gasket (FIPG) by the 3M Company of St. Paul, Minn. Similarly, a silver-filled epoxy may be used. When the CTE for the cover 250 is materially different than that of the see-through insert, it should further be appreciated that the conductive adhesive may be compliant so as to preserve the integrity of the seal between the cover 250 and the insert 240 even during expected temperature changes such as the temperature increase associated with disk drive operation.

Continuing to refer to FIG. 2, it should further be noted that the conductive label 220 (to which insert 240 is affixed with a conductive adhesive) may have a total area that exceeds that of the see-through insert 240. As such, at least one portion (e.g., edge) of the conductive label 220 will contact the cover 250 at one or more bare metal surfaces of the cover 250, thereby completing a ground path across the see-through insert 240.

Figure 3:
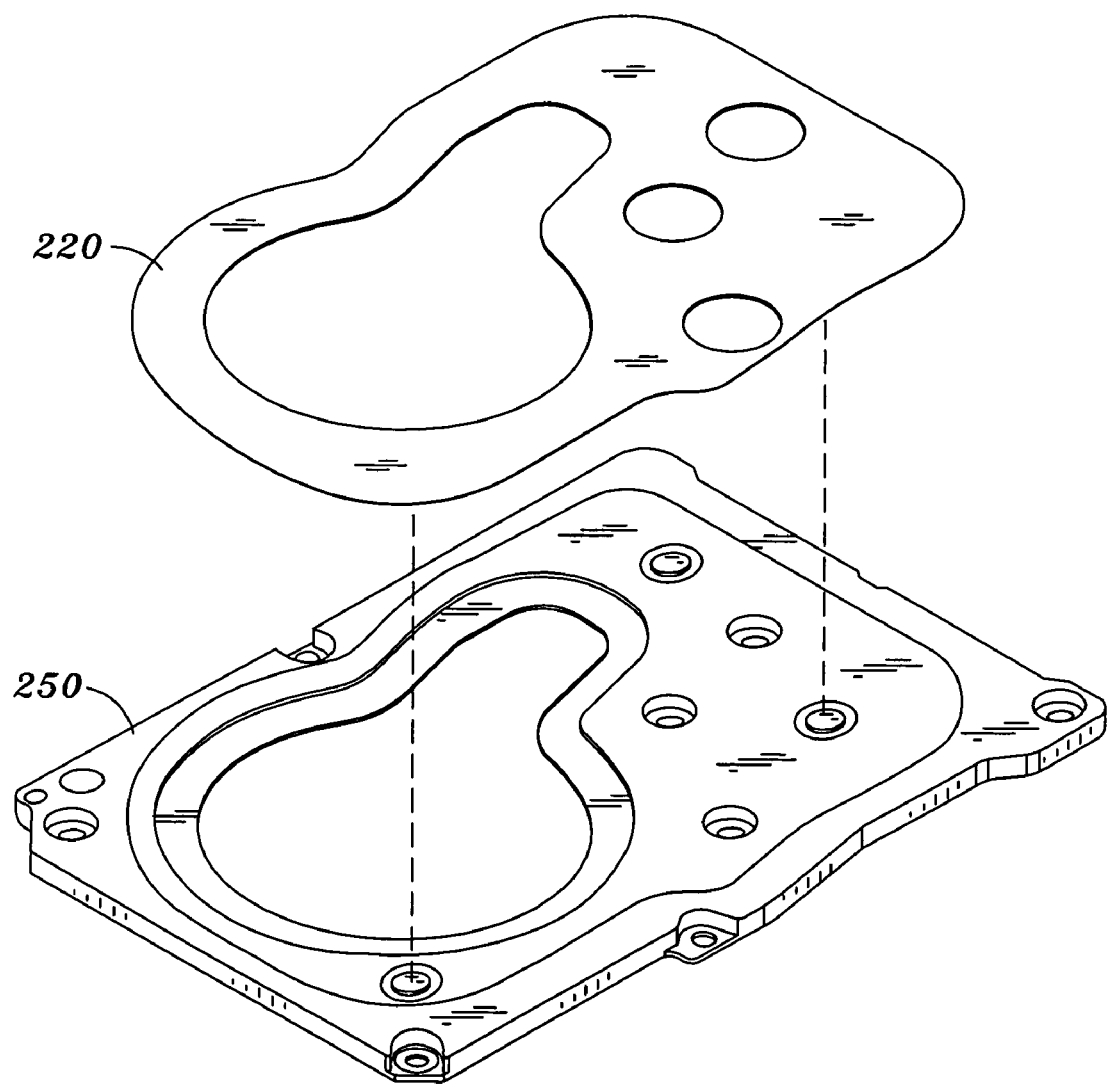
FIG. 3 is a perspective view of the orientation of a conductive label in accordance with another embodiment of the invention.

In sum, the embodiment of FIG. 2 ensures that a strain-tolerant bond between the insert 240 and cover 250 is maintained even during expected temperature changes. Additionally, since the see-through insert 240 includes an electrically conductive material, and since the conductive label 220 is affixed thereto with a conductive adhesive, as describe above, the grounding path for possible ESD events is maintained across the device, and even across the see-through insert 240 itself. For example, FIG. 3 depicts how the conductive label 220 may contact one or more bare metal surfaces of the cover 250 so as to electrically tie the insert (not shown) to the cover 250, as described in more detail below with reference to FIG. 4.

It should further be appreciated that the opening in cover 250 (and hence the insert 240) may overlay at least the spindle motor of the disk drive (e.g., disk drive 100) to which the cover 250 is attached. In one embodiment, this configuration will enable users to view at least some of the mechanical movements that occur within the HDD. Where the CTE for the cover 250 is materially different than that of the see-through insert 240, it should be appreciated that the spindle motor may be cantilevered. Alternatively, where the CTE for the cover 250 is not materially different than that of the see-through insert, the spindle motor may be attached to both the disk drive's base, as well as to the insert 240 itself.

Figure 4:
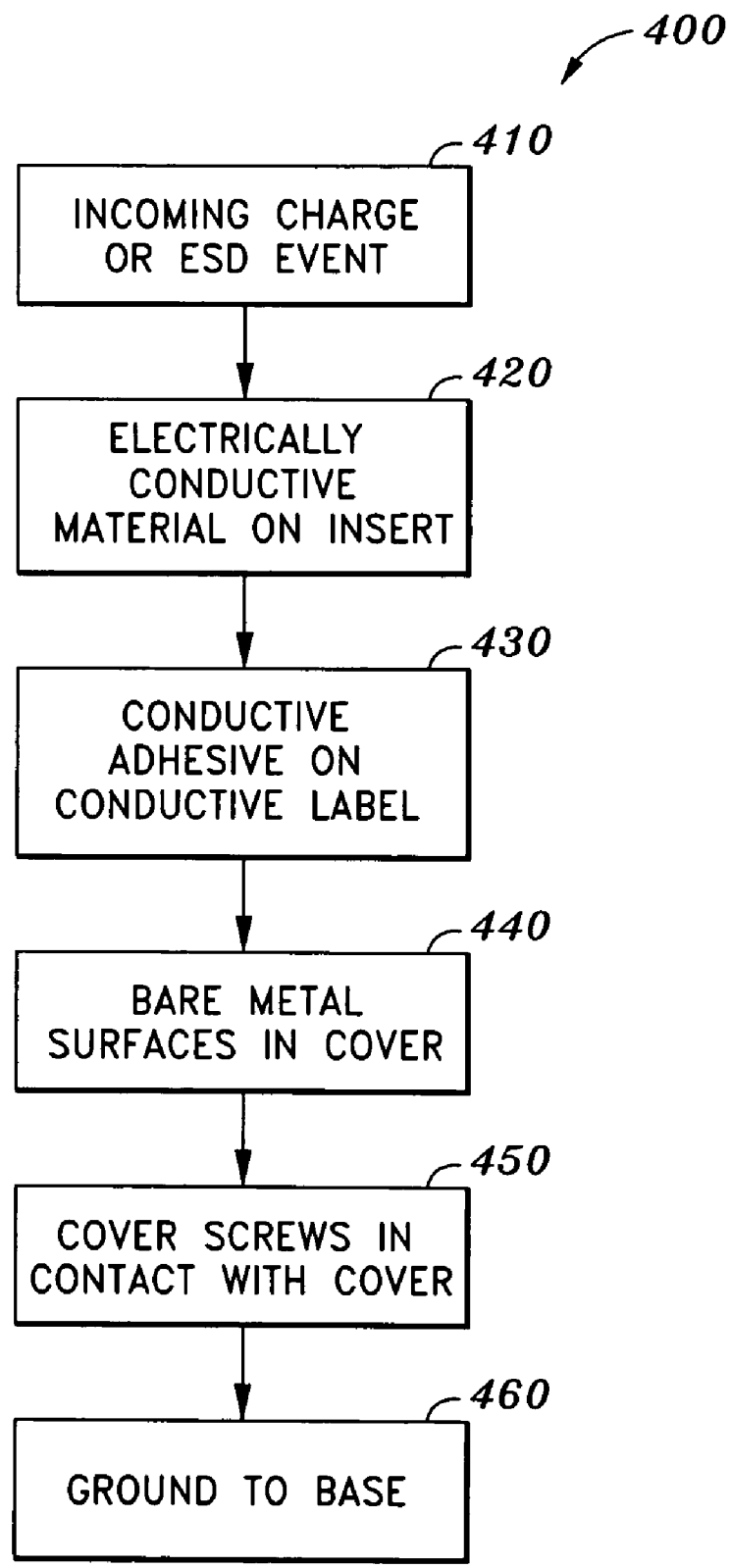
FIG. 4 is a flow diagram of the path taken by an electrical charge through a disk drive in accordance with one embodiment of the invention.

FIG. 4 is a flow diagram for the grounding path taken by electrical charges through a disk drive in accordance with the embodiment of FIG. 2. In particular, the path begins at block 410 with an incoming charge somewhere along a see-through insert of the invention (e.g., see-through insert 240). Charges then follow the grounding path provided by the electrically conductive material on or in the see-through insert at block 420. Since a conductive label has been affixed to the insert using a conductive adhesive, as described above with reference to FIG. 2, the grounding path will be directed radially outward towards the interface between the insert and the label (block 430). At block 440 the grounding path continues to a bare metal surface of the cover. That is, the label will have some portion which is not otherwise covered by the insert and which directly contacts a surface of the cover. Thereafter, at block 450 the grounding path proceeds from the cover into one or more screws inserted into the cover. The screws will provide the final segment of the grounding path since they extend into the base of the disk drive (block 460).

Figure 5:
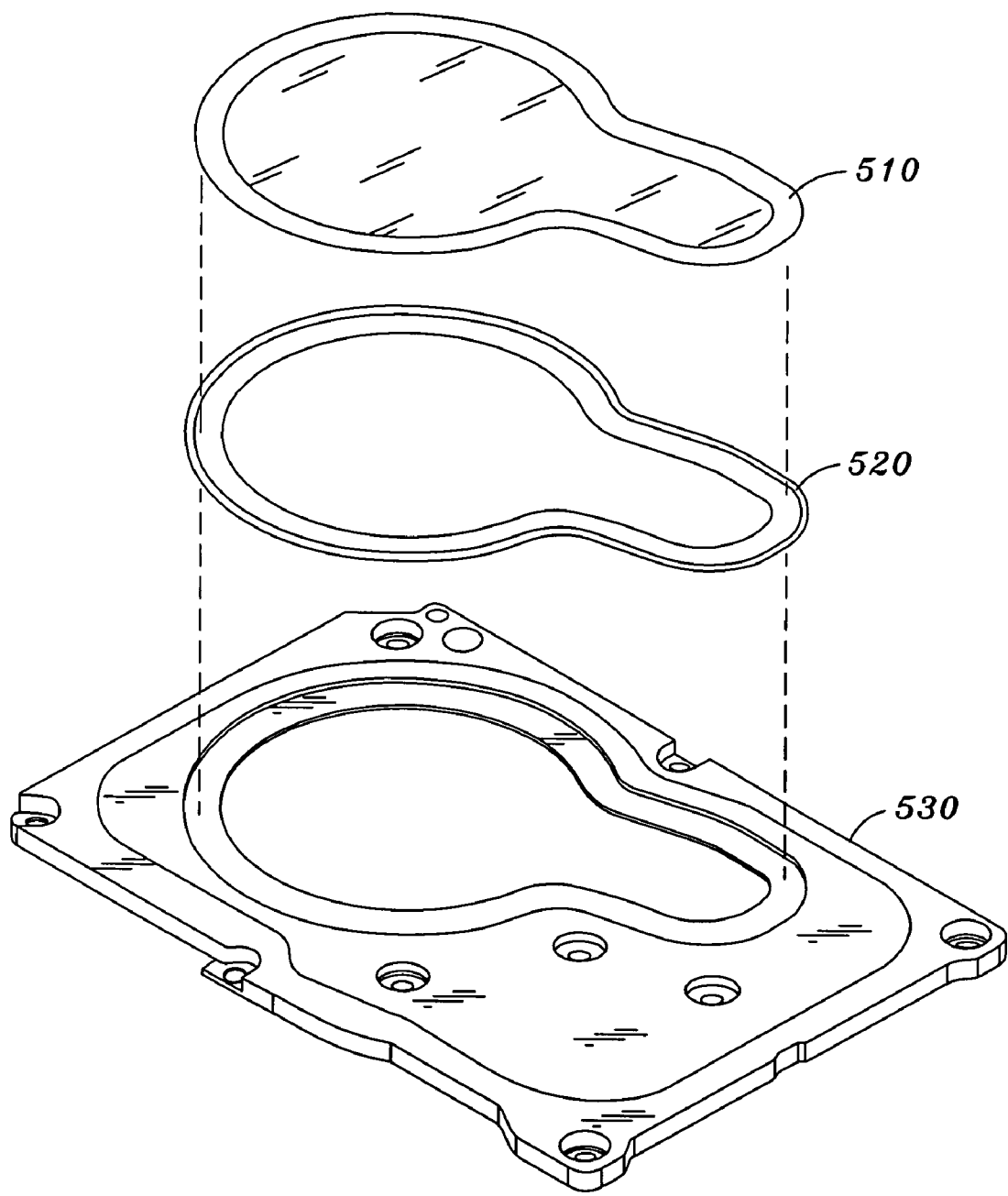
FIG. 5 is a perspective view of the orientation of a see-through insert of still another embodiment of the invention.

Referring now to FIG. 5, depicted one embodiment of how a see-through insert may be affixed to a disk drive cover without the use of a conductive label. In this embodiment, a see-through insert 510 is oriented over an opening of an opaque rigid cover 530, with a conductive adhesive 520 disposed there between. In one embodiment, the conductive adhesive 520 is a pressure-sensitive adhesive. In another embodiment, the conductive adhesive may be the product sold under the name Form-in-Place Gasket (FIPG) by the 3M Company of St. Paul, Minn.

As previously mentioned, the CTE for the cover 530 may be materially different than that of the see-through insert 510. In that case, the conductive adhesive 520 may be a compliant conductive adhesive so as to preserve the integrity of the resulting seal between the cover 530 and see-through insert 510 even during expected temperature changes such as the temperature increase associated with disk drive operation. Alternatively, the cover 530 may have a CTE that is substantially the same as the CTE for the see-through insert 510.

As with the embodiment of FIG. 2, the cover 530 may be constructed of a metallic material, while the see-through insert 510 is constructed of a see-through material such as a polycarbonate, glass, acrylic, ceramic or quartz.

As also described above with reference to FIG. 2, the see-through insert 510 of FIG. 5 further includes an electrically conductive material. The electrically conductive material may be an ESD-dissipative coating applied to a surface of the see-through insert, or it may be embedded in the see-through insert 510 itself, as has been previously described.

The opening in cover 530 preferably overlays at least the spindle motor of the disk drive (e.g., disk drive 100) to which the cover 530 is attached. This will provide consumers with the ability to view the various mechanical movements that occur within the disk drive. Where the CTE for the cover 530 is materially different than that of the see-through insert 510, the spindle motor is preferably cantilevered. Alternatively, where the CTE for the cover 530 is not materially different than that of the see-through insert 510, the spindle motor may be attached to the insert 240 itself, as well as to the disk drive's base.

Figure 6:
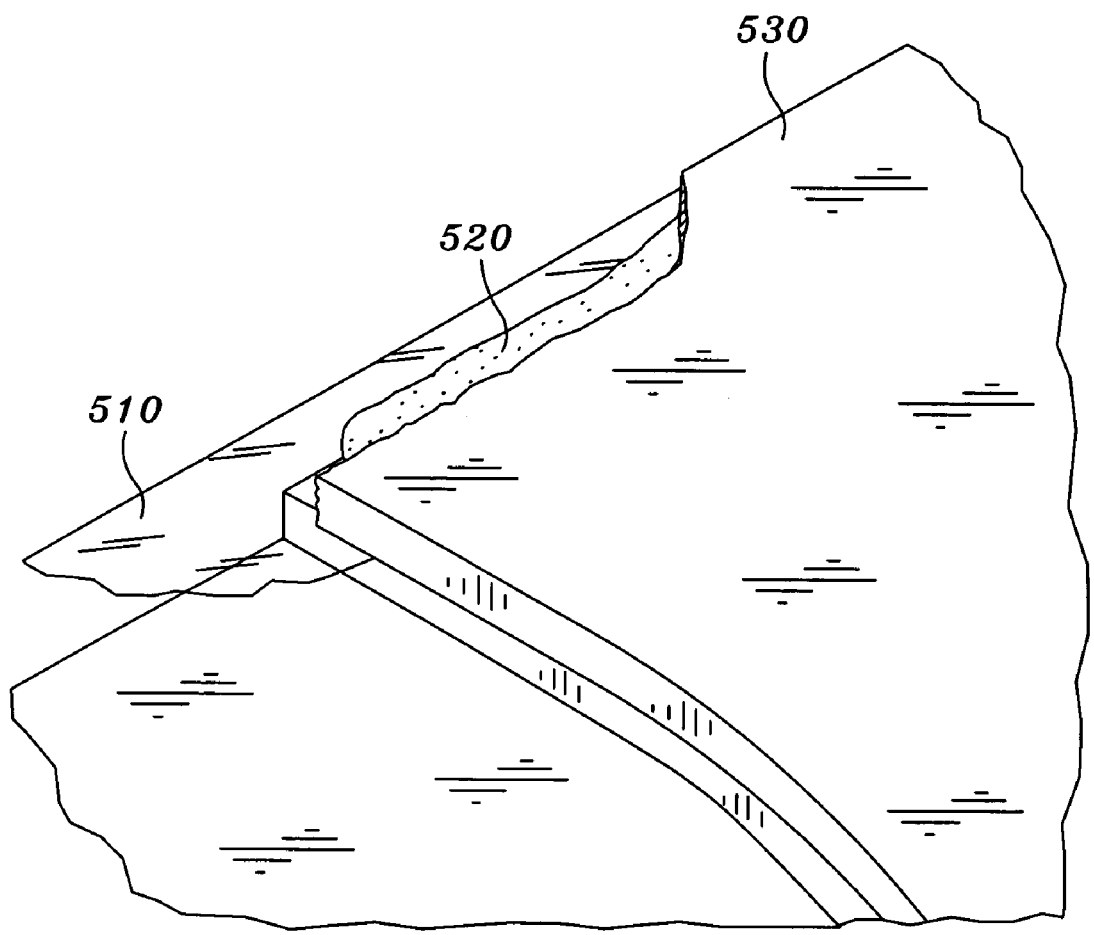
FIG. 6 is a cross sectional depiction of how a see-through insert may be affixed to a disk drive according to the principles of one embodiment of the invention.

FIG. 6 is a perspective view of the embodiment of FIG. 5 depicting a conductive adhesive 520 and the bond formed between the see-through insert 510 and the cover 530.

While the invention has been described in connection with various embodiments, it will be understood that the invention is capable of further modifications. This application is intended to cover any variations, uses or adaptations of the invention following, in general, the principles of the invention, and including such departures from the present disclosure within the known and customary practice in the art to which the invention pertains.

What is claimed is:

1. A disk drive comprising:
    a base;
    a spindle motor attached to the base;
    a disk mounted to the spindle motor, and having an axis of rotation about said spindle motor;
    an actuator attached to the base and having a pivot, said actuator having a head attached thereto for reading data from said disk;
    an opaque cover secured to the base, the opaque cover including an opening; and
    a see-through insert including an electrically conductive material, and being affixed to the opaque cover over the opening.

2. The disk drive of claim 1, wherein said opaque cover has a first thermal expansion coefficient that is substantially the same as a second thermal expansion coefficient for said see-through insert.

3. The disk drive of claim 2, further comprising a conductive label affixed to the see-through insert with a conductive adhesive.

4. The disk drive of claim 2, wherein said see-through insert is rigidly affixed to the opaque cover over the opening with a conductive adhesive.

5. The disk drive of claim 4, wherein the see-through insert overlays at least the spindle motor, and wherein said spindle motor is secured to the see-through insert.

6. The disk drive of claim 1, wherein the opaque cover has a first thermal expansion coefficient that is substantially different than a second thermal expansion coefficient of said see-through insert.

7. The disk drive of claim 6, wherein the see-through insert is affixed to the opaque cover with a compliant adhesive.

8. The disk drive of claim 7, wherein the compliant adhesive is a compliant conductive adhesive.

9. The disk drive of claim 6, further comprising a conductive label affixed to the see-through insert with a conductive adhesive.

10. The disk drive of claim 9, wherein the see-through insert has a foam gasket fixedly in contact with the opaque cover.

11. The disk drive of claim 6, wherein said spindle motor is cantilevered, and said see-through insert overlays at least said cantilevered spindle motor.

12. The disk drive of claim 6, wherein the spindle motor is affixed to the opaque cover and the see-through insert partially overlays the disk.

13. The disk drive of claim 1, wherein said opaque cover overlays said actuator pivot.

14. The disk drive of claim 1, wherein said see-through insert is manufactured from a material selected from the list consisting of: polycarbonate, glass, acrylic, ceramic and quartz.

15. The disk drive of claim 1, wherein said electrically conductive material is a polymer coating having a surface resistivity of between about 0.1 to about 30 Mega-Ohms.

16. The disk drive of claim 1, wherein said electrically conductive material is a coating.

17. The disk drive of claim 16, wherein the coating includes a material selected from the list consisting of sputtered gold, sputtered indium tin oxide, and metal film.

18. The disk drive of claim 1, wherein said electrically conductive material is embedded in the see-through insert.

19. The disk drive of claim 18, wherein said electrically conductive material includes a material selected from the list consisting of carbon nanotubes and a metallic material.

* * * * *